United States Patent
Lee et al.

(10) Patent No.: US 10,841,561 B2
(45) Date of Patent: Nov. 17, 2020

(54) APPARATUS AND METHOD FOR THREE-DIMENSIONAL INSPECTION

(71) Applicant: Test Research, Inc., Taipei (TW)

(72) Inventors: Wen-Tzong Lee, Pingtung (TW); Kuang-Pu Wen, Taipei (TW); Don Lin, Taipei (TW)

(73) Assignee: Test Research, Inc., Taipei (TW)

( * ) Notice: Subject to any disclaimer, the term of this patent is extended or adjusted under 35 U.S.C. 154(b) by 201 days.

(21) Appl. No.: 15/468,128

(22) Filed: Mar. 24, 2017

(65) Prior Publication Data
US 2018/0278911 A1    Sep. 27, 2018

(51) Int. Cl.
| | | |
|---|---|---|
| *H04N 13/243* | (2018.01) | |
| *H04N 13/254* | (2018.01) | |
| *G01B 11/25* | (2006.01) | |
| *H04N 13/271* | (2018.01) | |
| *H04N 13/00* | (2018.01) | |

(52) U.S. Cl.
CPC ....... *H04N 13/243* (2018.05); *G01B 11/2545* (2013.01); *H04N 13/254* (2018.05); *H04N 13/271* (2018.05); *H04N 2013/0081* (2013.01)

(58) Field of Classification Search
CPC .. H04N 13/02; H04N 13/0242; H04N 13/243; H04N 13/254; G06T 7/0004; G06T 7/00
See application file for complete search history.

(56) References Cited

U.S. PATENT DOCUMENTS

| | | | |
|---|---|---|---|
| 6,377,353 B1 | 4/2002 | Ellis | |
| 6,879,338 B1 * | 4/2005 | Hashimoto | H04N 5/2251 348/36 |
| 8,340,355 B2 * | 12/2012 | Yano | H04N 13/246 382/106 |

(Continued)

FOREIGN PATENT DOCUMENTS

| | | |
|---|---|---|
| CN | 101995231 A | 3/2011 |
| CN | 105990378 A | 10/2016 |

(Continued)

OTHER PUBLICATIONS

Beyerer, J.: Leon, F. P.; Frese, C.: Automatische Sichtprufung-Grundlagen,Methoden und Praxis der Bildgewinnung und Bildauswertung (In English : Automatic visual inspection, Basics, methods and practice of image acquisition and image evaluation. Berlin-Heidelberg: Springer, 2012. pp. 168-169, 302, 341-349.

(Continued)

*Primary Examiner* — Dramos Kalapodas
(74) *Attorney, Agent, or Firm* — CKC & Partners Co., LLC (57) ABSTRACT

An apparatus for three-dimensional inspection includes a carrier, an image sensing component, and a processor. The carrier is configured to hold an object. The image sensing component is configured to capture a first image, a second image and a third image of the object along a first axis, a second axis, and a third axis respectively, and the first axis, the second axis, and the third axis are not parallel with each other. The processor is configured to analyze the first image (Continued)

and the second image to obtain a first directional stereo information, and analyze the third image and a determined image of the object to obtain a second directional stereo information.

5 Claims, 6 Drawing Sheets

(56) References Cited

U.S. PATENT DOCUMENTS

| | | | |
|---|---|---|---|
| 9,384,551 B2* | 7/2016 | Ramaswamy | G06T 7/85 |
| 2004/0234122 A1* | 11/2004 | Kochi | G01B 11/24 |
| | | | 382/154 |
| 2005/0136819 A1 | 6/2005 | Kriesel | |
| 2005/0257748 A1 | 11/2005 | Kriesel | |
| 2006/0061680 A1* | 3/2006 | Madhavan | H04N 5/2251 |
| | | | 348/370 |
| 2009/0087031 A1 | 4/2009 | Yano et al. | |
| 2010/0092041 A1* | 4/2010 | Kim | G01B 11/2513 |
| | | | 382/106 |
| 2011/0002529 A1* | 1/2011 | Jeong | G01B 11/25 |
| | | | 382/147 |
| 2011/0235897 A1 | 9/2011 | Watanabe et al. | |
| 2013/0070048 A1 | 3/2013 | Huang et al. | |
| 2014/0022357 A1* | 1/2014 | Yu | G01B 11/25 |
| | | | 348/48 |
| 2014/0232857 A1* | 8/2014 | Jahnke | G01B 11/245 |
| | | | 348/135 |
| 2017/0178354 A1* | 6/2017 | Wendler | H04N 13/254 |
| 2018/0035099 A1* | 2/2018 | Huang | H04N 13/243 |
| 2018/0061034 A1* | 3/2018 | Zhao | G02B 27/0172 |

FOREIGN PATENT DOCUMENTS

| | | |
|---|---|---|
| JP | 2003296708 A | 10/2003 |
| JP | 2011149849 A | 8/2011 |
| JP | 2015017921 A | 1/2015 |
| JP | 2015045587 A | 3/2015 |
| JP | 2016125953 A | 7/2016 |
| TW | 201346833 A | 11/2013 |
| TW | 201405092 A | 2/2014 |
| TW | 201629909 A | 8/2016 |

OTHER PUBLICATIONS

Kang, S. B.; et al.: A Multibaseline Stereo System with Active Illumination and Real-time Image Acquisition, In: Fifth International Conference on Computer Vision, 1995. IEEE, 1995. pp. 88-93.

* cited by examiner

APPARATUS AND METHOD FOR THREE-DIMENSIONAL INSPECTION

BACKGROUND

Field of Invention

The present invention relates to an apparatus and a method for three-dimensional inspection.

Description of Related Art

In recent years, processes to manufacture various electric components include a process of inspecting a three-dimensional object. For example, in the fabrication process of electronic boards, a soldered state of each component is inspected after mounting the component to a board and executing a reflow process.

In conventional methods of inspecting the three-dimensional object (i.e. soldered states), inspection is performed in such a way that an inspector inspects the three-dimensional object (i.e. soldered states) with his naked eyes. Therefore, the qualities of products using the three-dimensional object (i.e. soldered states) are not uniform, depending on conditions and skill of the inspectors. Further, the conventional methods are problematic in that the productivity of products is remarkably low due to their long inspection times when complicated electric components (i.e. printed circuit boards) are inspected.

SUMMARY

According to the exemplary embodiments of the invention, the appearance of the object is reconstructed from the first and second directional stereo information. The first and second directional stereo information may be obtained by calculating two pairs of images respectively, in which they may share one of the images. Alternatively, the first and second directional stereo information may be obtained by two pairs of different images, in which the images are different from each other. Through the configuration, the inspection of the object is improved to be more accurate.

According to some embodiments of the present invention, an apparatus for three-dimensional inspection includes a carrier, an image sensing component, and a processor. The carrier is configured to hold an object. The image sensing component is configured to capture a first image, a second image and a third image of the object along a first axis, a second axis, and a third axis respectively, and the first axis, the second axis, and the third axis are not parallel with each other. The processor is configured to analyze the first image and the second image to obtain a first directional stereo information, and analyze the third image and a determined image of the object to obtain a second directional stereo information, in which a determined axis that the determined image is captured along is not parallel with the second axis or the third axis.

In some embodiments of the present invention, the image sensing component includes plural image sensors, respectively located on the first axis, the second axis, and the third axis for capturing the first image, the second image and the third image.

In some embodiments of the present invention, the image sensing component comprises a static image sensor and a movable image sensor, the static image sensor is located on the first axis and for capturing the first image, and the movable image sensor is configured to move from the second axis to the third axis to capture the second image and the third image.

In some embodiments of the present invention, the determined image is the first image, and the first axis is normal to a top surface of the carrier.

In some embodiments of the present invention, the determined image is the first image, and the third axis is located on a first plane formed by the first axis and the second axis.

In some embodiments of the present invention, the determined image is the first image, and the third axis is not located on a first plane formed by the first axis and the second axis.

In some embodiments of the present invention, the image sensing component is further configured to capture a fourth image of the object along a fourth axis, and the processor is configured to analyze the first image and the fourth image to obtain a third directional stereo information, wherein the third axis and the fourth axis respectively extend toward opposite sides of the first plane.

In some embodiments of the present invention, the image sensing component is further configured to capture a fifth image of the object along a fifth axis, and the processor is configured to analyze the first image and the fifth image to obtain a fourth directional stereo information, wherein the second axis and the fifth axis respectively extend toward opposite sides of a second plane formed by the third axis and the fourth axis.

In some embodiments of the present invention, the image sensing component is further configured to capture a fourth image of the object along a fourth axis, wherein the fourth axis is not parallel to the first axis, the second axis, and the third axis, and the determined image is the fourth image.

In some embodiments of the present invention, the image sensing component comprises plural image sensors, respectively located on the first axis, the second axis, the third axis, and the fourth axis, for capturing the first image, the second image, the third image, and the fourth image.

In some embodiments of the present invention, the image sensing component comprises a static image sensor and a movable image sensor, the static image sensor is located on the first axis and configured to capture the first image, and the movable image sensor is configured to capture at least one of the second image, the third image, and the fourth image along at least one of the second axis, the third axis, and the fourth axis.

In some embodiments of the present invention, a first plane formed by the first axis and the second axis is vertical to a top surface of the carrier, and a second plane formed by the third axis and the determined axis that the determined image is captured along is vertical to a top surface of the carrier.

In some embodiments of the present invention, a first plane formed by the first axis and the second axis has an inclined angle with respect to a top surface of the carrier, and the inclined angle is in a range of 80 degrees to 100 degrees.

In some embodiments of the present invention, a first plane formed by the first axis and the second axis is not parallel to a second plane formed by the third axis and the determined axis that the determined image is captured along.

In some embodiments of the present invention, the apparatus further includes a projector configured to project a light pattern onto the object.

According to some embodiments of the present invention, a method for three-dimensional inspection includes disposing an object onto a carrier; capturing a first image of the object along a first axis, capturing a second image of the object along a second axis, and capturing a third image of the object along a third axis, wherein the first axis, the second axis, and the third axis are not parallel with each other; analyzing the first image and the second image to obtain a first directional stereo information; and analyzing the third image and a determined image of the object to obtain a second directional stereo information, in which a determined axis that the determined image is captured along is not parallel with the second axis or the third axis.

In some embodiments of the present invention, the determined image is the first image.

In some embodiments of the present invention, the method further includes projecting a light pattern having a plurality of dots distributed randomly onto the object, wherein the capturing the first image, the second image, and the third image of the object comprises capturing the light pattern on the object, and the dots on a portion of the object have a distribution different from the dots on any other portion of the object.

It is to be understood that both the foregoing general description and the following detailed description are illustrated by examples, and are intended to provide further explanation of the invention as claimed.

BRIEF DESCRIPTION OF THE DRAWINGS

The invention can be more fully understood by reading the following detailed description of the embodiment, with reference made to the accompanying drawings as follows.

DETAILED DESCRIPTION

Reference will now be made in detail to the present embodiments of the invention, examples of which are illustrated in the accompanying drawings. Wherever possible, the same reference numbers are used in the drawings and the description to refer to the same or like parts.

Figure 1:
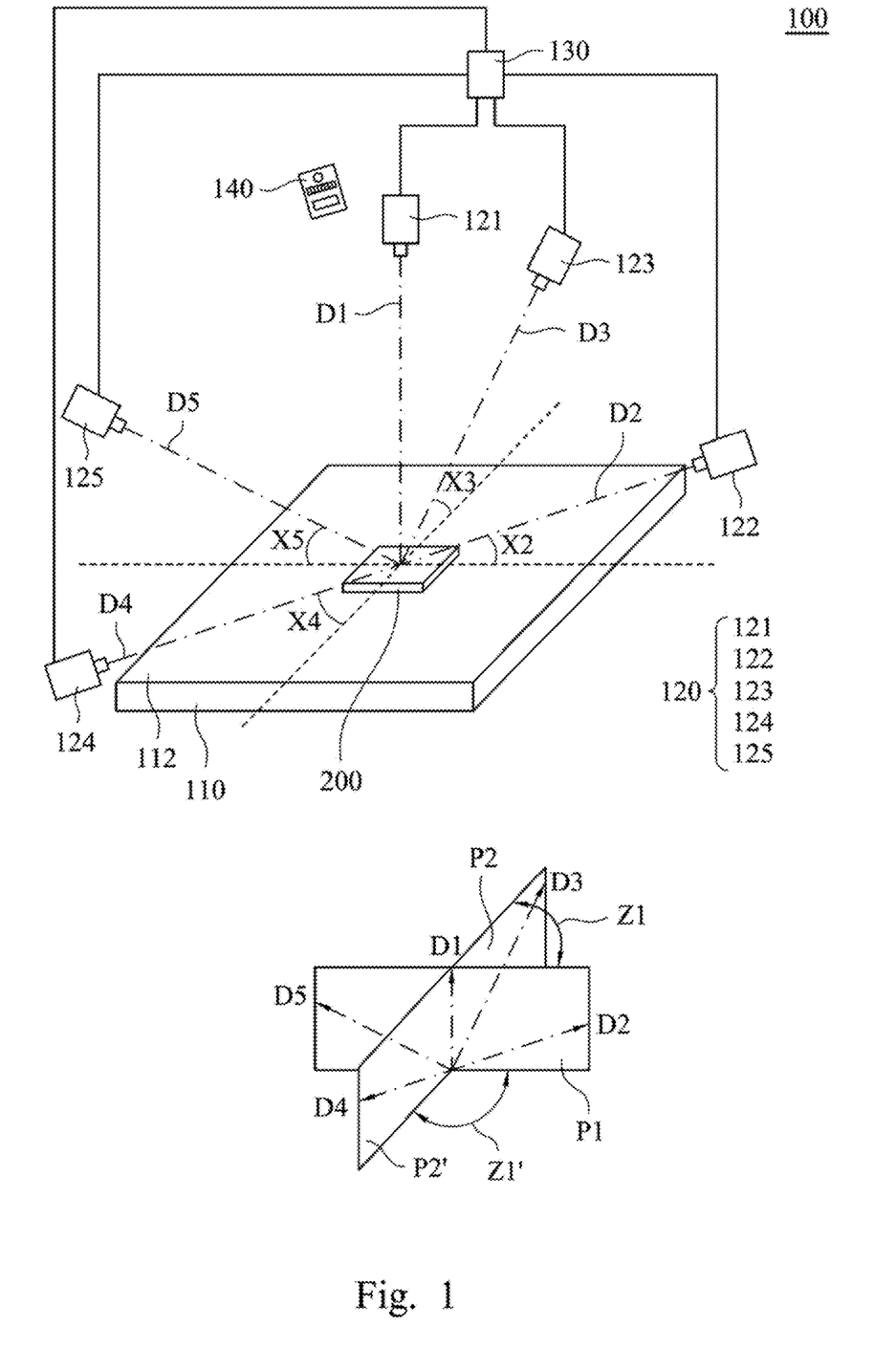
FIG. 1 is a schematic stereo view of an apparatus for three-dimensional inspection according to some embodiments of the invention.
Figure 2:
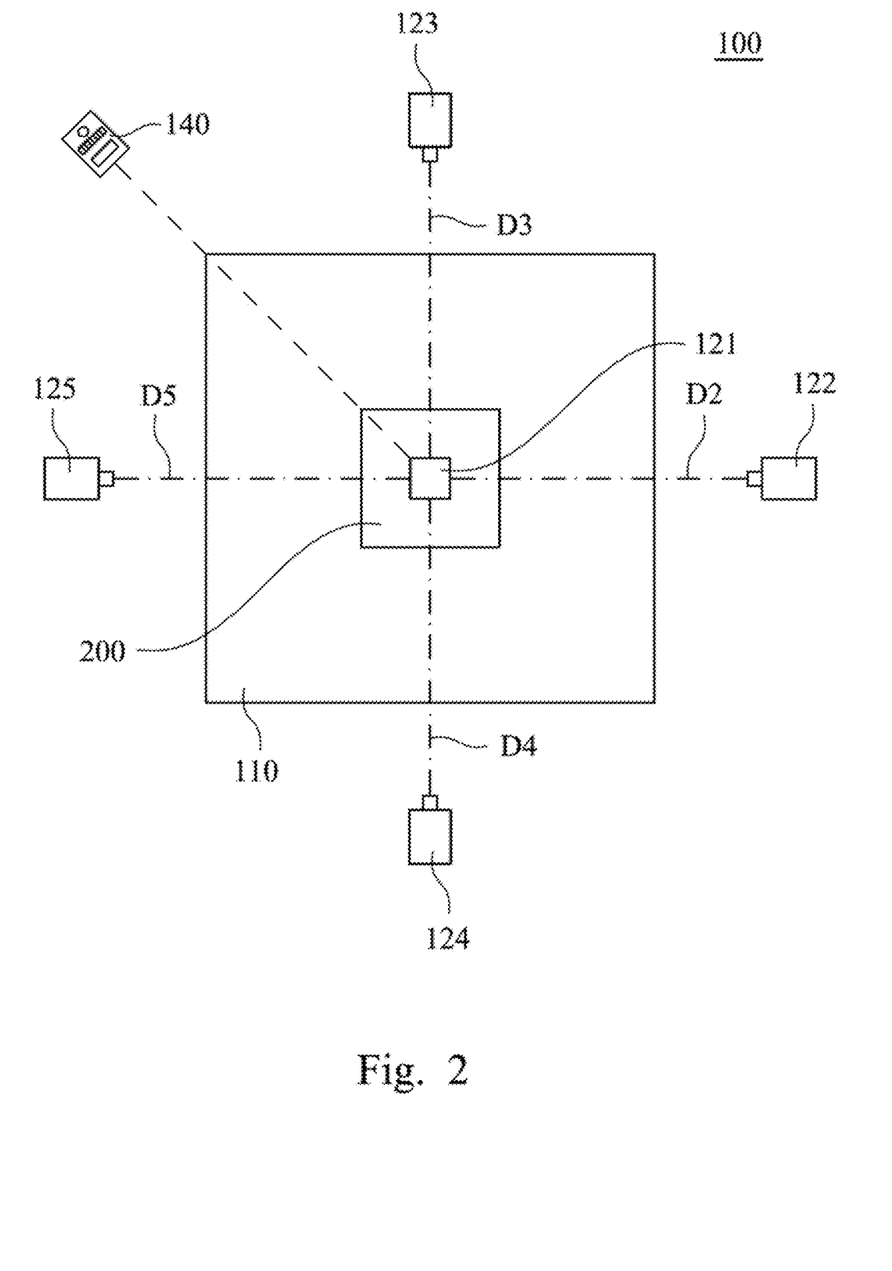
FIG. 2 is a top view of the apparatus for three-dimensional inspection of FIG. 1.

FIG. 1 is a schematic stereo view of an apparatus 100 for three-dimensional inspection according to some embodiments of the invention. FIG. 2 is a top view of the apparatus 100 for three-dimensional inspection of FIG. 1. The apparatus 100 for three-dimensional inspection includes a carrier 110, an image sensing component 120, a processor 130, and a projector 140. The carrier 110 is configured to hold an object 200. The projector 140 is configured to project a light pattern onto the object 200. The image sensing component 120 is configured to capture a first image, a second image, a third image, a fourth image, and a fifth image of the object 200 along a first axis D1, a second axis D2, and a third axis D3, a fourth axis D4, and a fifth axis D5 respectively. The first axis D1, the second axis D2, the third axis D3, the fourth axis D4, and the fifth axis D5, are not parallel with each other. The processor 130 is configured to analyze the first image and the second image to obtain a first directional stereo information, and analyze the third image and a determined image of the object 200 to obtain a second directional stereo information. In some embodiments of the present invention, the determined image is captured along a determined axis that is not parallel with the second axis D2 or the third axis D3. For example, the determined axis may be one of the first axis D1, the fourth axis D4, and the fifth axis D5.

In some embodiments of the present invention, the image sensing component 120 includes plural image sensors 121~125, respectively located on the first axis D1, the second axis D2, and the third axis D3, the fourth axis D4, and the fifth axis D5 for capturing the first image, the second image, the third image, the fourth image, and the fifth image. In some embodiments, the distances between the object and the image sensors 121~125 are substantially the same, the image sensors 121~125 are identical, and therefore resolutions of the first to fifth images are substantially the same. Of course, it should not limit the scope of the present invention, and in some embodiments, the distances between the object and the image sensors 121~125 may be different. Also, the image sensors 121~125 may be different.

Herein, in some embodiments, the angle X2~X5 between the second to fifth axis D2~D5 and the top surface 112 of the carrier 110 are substantially the same, but it should not limit the scope of the present invention. In other embodiments, the angle X2~X5 may be different. In addition, in some embodiments, the first to fifth axis D1~D5 intersect at a point of the object 200. In other embodiments, the first to fifth axis D1~D5 do not intersect at the same position, but direct toward a portion of the object 200 (e.g., a region of interest ROI).

In some embodiments of the present invention, a first plane P1 formed by the first axis D1 and the second axis D2 is vertical to a top surface 112 of the carrier 110, and a second plane formed by the third axis D3 and the determined axis that the determined image is captured along is vertical to a top surface 112 of the carrier 110. The vertical configurations simplify the calculation in the analyzation for obtaining the directional stereo information and therefore increase the accuracy of the directional stereo information. However, it is not intended to precisely limit the angle between the first plane P1 and the top surface 112 of the carrier 110 to be 90 degrees, but a tolerance may be given. For example, the first plane P1 may have an inclined angle with respect to the top surface 112 of the carrier 110, and the inclined angle may be in a range of 60 degrees to 120 degrees, preferably a range of 80 degrees to 100 degrees. Also, the second plane may have an inclined angle in a range of 60 degrees to 120 degrees, preferably a range of 80 degrees to 100 degrees, with respect to a top surface of the carrier. It is noted that the numerical value of the inclined angle should not limit the scope of the present invention.

In some other embodiments, the first plane P1 and the second plane may not be vertical to the top surface 112 of the carrier 110. The relevant details (e.g. the tilted angle between the first plane P1 and the top surface 112 or the tilted angle between the second plane and the top surface 112) may be factors in the analyzation for obtaining the directional stereo information.

In the present invention, the first and second directional stereo information can be acquired in many methods, which are illustrated in the following.

For a first one of the methods, the first axis D1 is normal to a top surface 112 of the carrier 110, and the determined image relating to the second directional stereo information may be the first image. In the embodiments, the first plane P1 formed by the first axis D1 and the second axis D2 is substantially vertical to the top surface 112 of the carrier 110, and a second plane P2 formed by the third axis D3 and a determined axis that the determined image is captured along (which is referred to the first axis D1 herein) is substantially vertical to the top surface 112 of the carrier 110.

Herein, the third axis D3 relating to the second directional stereo information may be not located on the first plane P1. For example, the second plane P2 has an angle Z1 with respect to the first plane P1, in which the angle Z1 may be in a range from 0 degree to 90 degrees, such as 10 degrees to 90 degrees. In the present embodiments, the first plane P1 is orthogonal to the second plane P2 (i.e. the angle Z1 is 90 degrees), such that the first directional stereo information and second directional stereo information reveal the appearance of the object in two orthogonal directions. However, it should not limit the scope of the present invention, and in some embodiments, the first plane P1 may not be orthogonal to the plane related to the second directional stereo information. For example, if the second directional stereo information is obtained from images captured along the first axis D1 and the fifth axis D5, which are on the first plane P1, the plane relating to the second directional stereo information may be parallel with the first plane P1.

Through the configuration, the first directional stereo information and second directional stereo information are built from the first image, the second image and the third image.

Figure 3:
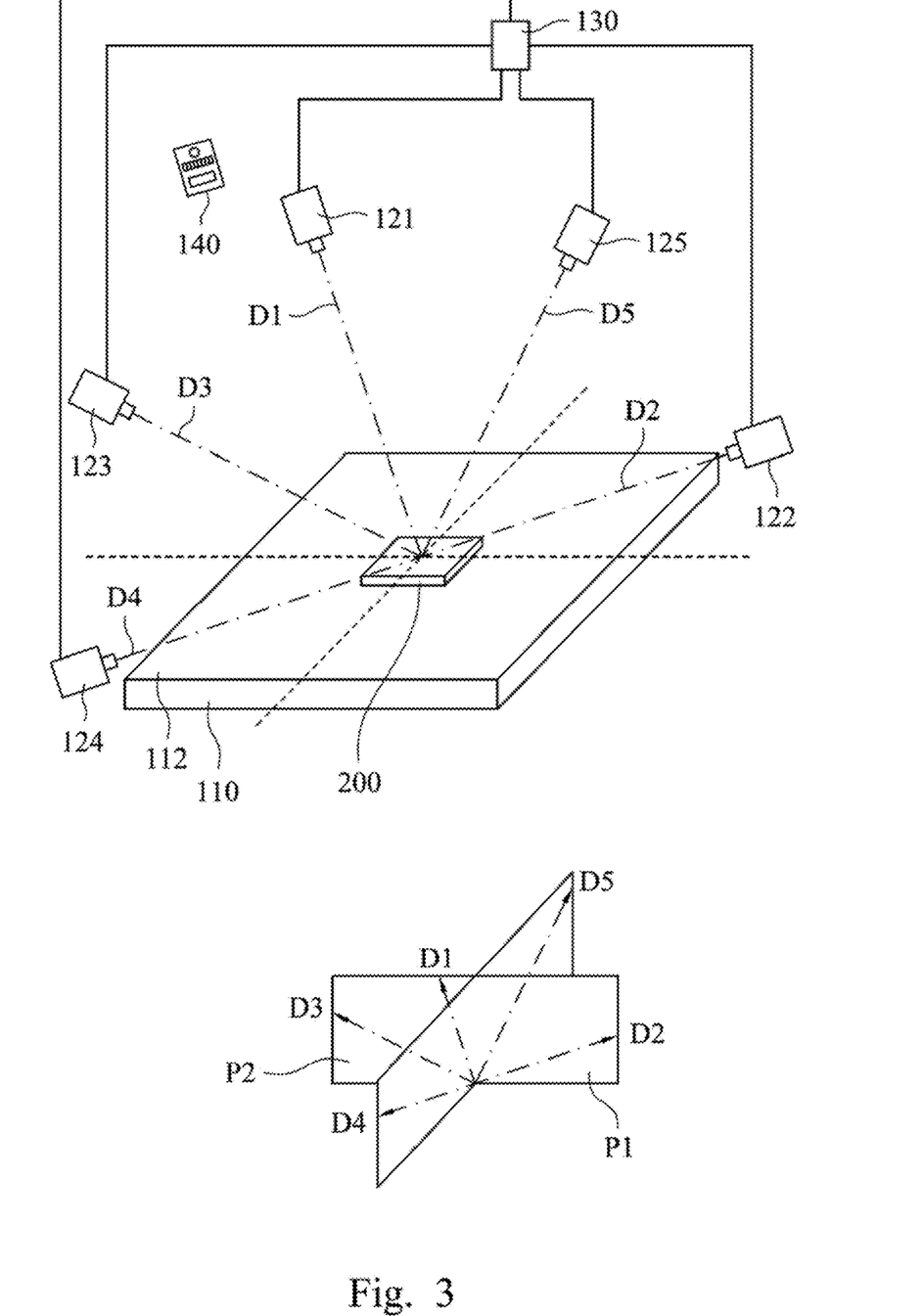
FIG. 3 is a schematic stereo view of an apparatus for three-dimensional inspection according to some embodiments of the invention.

For a second one of the methods, the determined image relating to the second directional stereo information may be the first image, but the first axis D1 is not normal to a top surface 112 of the carrier 110. FIG. 3 is a schematic stereo view of an apparatus 100 for three-dimensional inspection according to some embodiments of the invention. The embodiments of FIG. 3 are similar to the embodiments of FIG. 1, and the difference is that: the first axis D1 is not normal to the top surface 112 of the carrier 110. In the present embodiments, the first axis D1, the second axis D2, and the third axis D3 are formed on the same plane. Through the configuration, the first plane P1 formed by the first axis D1 and the second axis D2 is parallel with a second plane P2 formed by the third axis D3 and the determined axis that the determined image is captured along (which is referred to the first axis D1 herein).

Herein, the first plane P1 and the second plane P2 may be vertical to the top surface 112 of the carrier 110. As illustrated previously, the vertical configurations simplify the calculation in the analyzation for obtaining the directional stereo information and therefore increase the accuracy of the directional stereo information. Also, it is not intended to precisely limit the angle between the first plane P1 or the second plane P2 and the top surface 112 of the carrier 110 to be 90 degrees, but a tolerance may be given. For example, the first plane P1 or the second plane P2 has an inclined angle with respect to the top surface 112 of the carrier 110, and the inclined angle may be in a range of 60 degrees to 120 degrees, preferably in a range of 80 degrees to 100 degrees. It is noted that the numerical value of the inclined angle should not limit the scope of the present invention.

As illustrated previously, the first image and the second image are analyzed to obtain the first directional stereo information, and the first image and the third image are analyzed to obtain the second directional stereo information.

For a third one of the methods, the determined image may not be the first image but the fourth image. Reference is made back to FIG. 1. In some embodiments, the third image and the determined image (which is the fourth image herein) are analyzed to obtain the second directional stereo information. As illustrated previously, the second plane P2' formed by the third axis D3 and a determined axis that the determined image is captured along (which is referred to the fourth axis D4 herein) may be vertical to the top surface 112 of the carrier 110. As aforementioned, the second plane P2' may have an inclined angle in a range of 80 degrees to 100 degrees with respect to the top surface 112 of the carrier 110.

Herein, the first axis D1 may be normal to the top surface 112 of the carrier 110. However, in some other embodiments, the first axis D1 may not be normal to the top surface 112 of the carrier 110. For example, in some other embodiments, the first axis D1 may be exchanged with the fifth axis D5, and therefore, none of the images used to calculate the first and second directional stereo information is captured along an axis normal to the top surface 112 of the carrier 110.

In some embodiments, at least one of the third axis D3 and the determined axis (which is referred to the fourth axis D4 herein) relating to the second directional stereo information is not located on the first plane P1. For example, the second plane P2' has an angle Z1' with respect to the first plane P1, in which the angle Z1' may be in a range from 10 degrees to 90 degrees, but it is noted that the numerical value of the angle Z1' should not limit the scope of the present invention. In the present embodiments, the first plane P1 is orthogonal to the second plane P2' (i.e. the angle Z1' is 90 degrees), such that the first directional stereo information and second directional stereo information reveals the appearance of the object in two orthogonal directions. However, it should not limit the scope of the present invention, and in some embodiments, the first plane P1 may not be orthogonal to the second plane P2'.

Through the method illustrated above, the first and second directional stereo information are obtained. The processor 130 may optionally further combine the first and second directional stereo information into an integrated stereo information. It is noted that more than two directional stereo information may be calculated and obtained, and may further be used to construct the integrated stereo information. For example, third and fourth directional stereo information may be calculated and obtained from the fourth image and the fifth image.

For example, in some embodiments of the present invention, the processor 130 is configured to analyze the first image and the fourth image to obtain a third directional stereo information. In some embodiments, a plane formed by the first axis D1 and the fourth axis D4 is vertical to the top surface 112 of the carrier 110. For example, the first axis D1 is normal to the top surface 112 of the carrier 110. Through the configuration, the processor 130 may analyze the first image and the second image to obtain the first directional stereo information, analyze the first image and the third image to obtain the second directional stereo information, and analyze the first image and the fourth image to obtain the third directional stereo information.

Herein, above the top surface 112 of the carrier 110, the third axis D3 and the fourth axis D4 respectively extend toward opposite sides of the first plane P1, so as to detect the object 200 in every aspect. However, it should not limit the scope of the present invention, above the top surface 112 of the carrier 110, the third axis D3 and the fourth axis D4 extend toward the same side of the first plane P1, so as to detect the object 200 more precisely.

Furthermore, in some embodiments of the present invention, the processor 130 is configured to analyze the first image and the fifth image to obtain a fourth directional stereo information. In some embodiments, a plane formed by the first axis D1 and the fifth axis D5 is vertical to the top surface 112 of the carrier 110. For example, the first axis D1 is normal to the top surface 112 of the carrier 110. Through the configuration, the processor 130 may analyze the first image and the second image to obtain the first directional stereo information, analyze the first image and the third image to obtain the second directional stereo information, analyze the first image and the fourth image to obtain the third directional stereo information, and analyze the first image and the fifth image to obtain the fourth directional stereo information.

Herein, above the top surface 112 of the carrier 110, the second axis D2 and the fifth axis D5 respectively extend toward opposite sides of the second plane P2 formed by the third axis D3 and the first axis D1 or the second plane P2' formed by the third axis D3 and the fourth axis D4, so as to detect the object 200 in every aspect. However, it should not limit the scope of the present invention, above the top surface 112 of the carrier 110, the third axis D3 and the fourth axis D4 extend toward the same side of the second plane P2 or P2', so as to detect the object 200 more precisely.

Moreover, in some embodiments of the present invention, the processor 130 is configured to analyze the second image and the fifth image to obtain a fifth directional stereo information. In some embodiments of the present invention, the processor 130 is configured to analyze the third image and the fourth image to obtain a sixth directional stereo information. Through the configuration, some of the first to fifth directional stereo information are obtained and are taken as the criteria for a test of the object, for example, a test of soldered states on printed circuit boards. It is noted that, depending on the number of the directional stereo information required, some of the image sensors 121~125 may be omitted or turned off. For example, in simple embodiments, the image sensing component 120 may only include image sensors 121~123. Alternatively, in some embodiments, the image sensing component 120 may only include image sensors 121, 122, and 125. In some other embodiments, the image sensing component 120 may only include image sensors 122~125.

In the embodiments of the present invention, the object 200 has at least one the three-dimensional feature thereon. For example, the object 200 may be a printed circuit board, and the three-dimensional feature may be a soldered state. The projector 140 may include a light source and a reticle having a pattern, such that light emitted from the light source are partially shielded by the reticle, and the light transmitted through the reticle has the pattern. In some embodiments, the image sensors 121~125 are capable of measuring the intensity of the light reflected by the object 200. For example, the image sensors 121~125 are charge coupled device (CCD) cameras, complementary metal-oxide-semiconductor (CMOS) image sensors, junction gate field-effect transistor (JFET) imaging sensors, or other suitable photosensitive devices.

Figure 4:
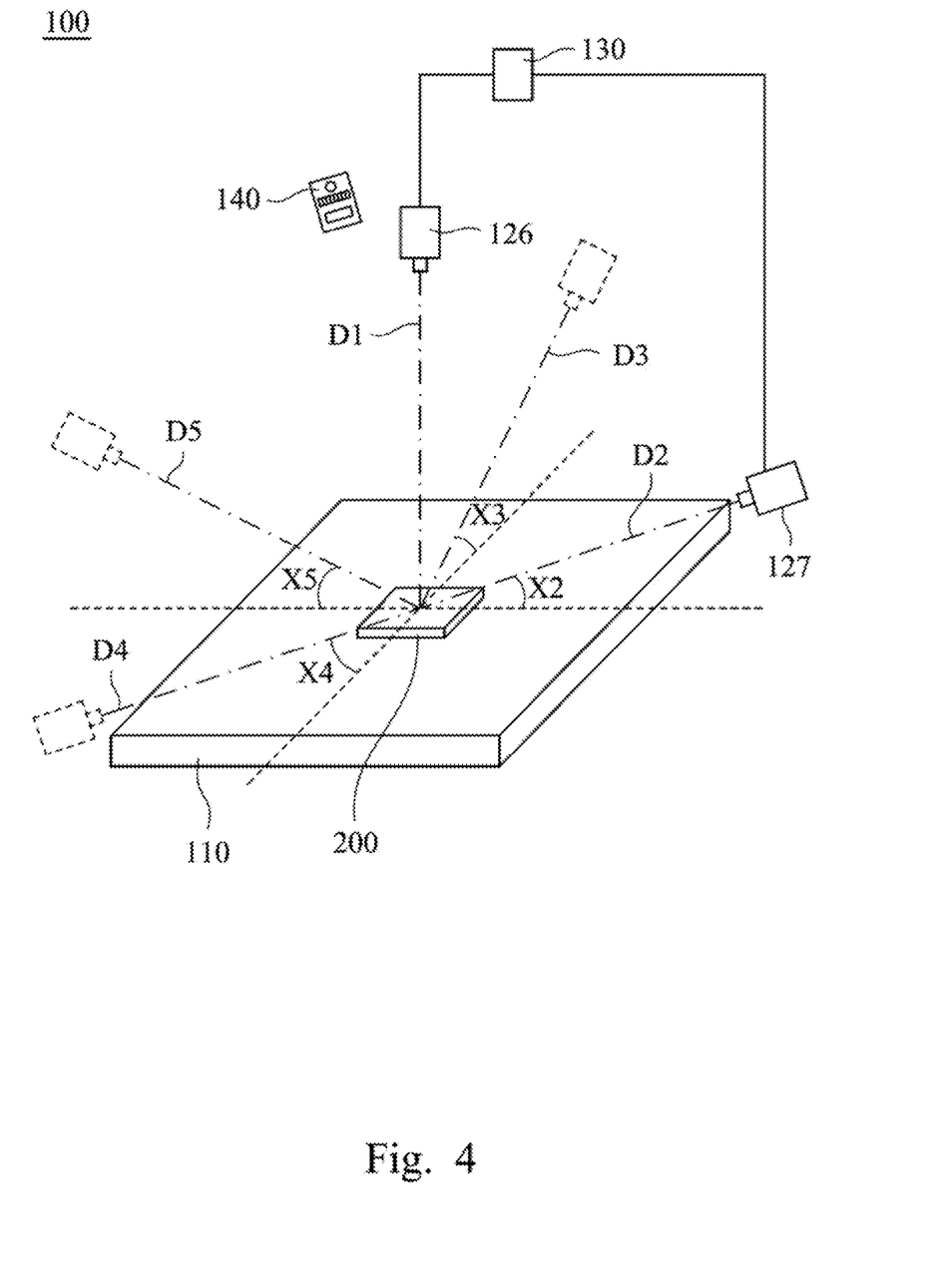
FIG. 4 is a schematic stereo view of an apparatus for three-dimensional inspection according to some embodiments of the invention.

FIG. 4 is a schematic stereo view of an apparatus for three-dimensional inspection according to some embodiments of the invention. The present embodiments are similar to the embodiments of FIG. 1, and the difference lies in: in the present embodiments, the image sensing component 120 comprises a static image sensor 126 and a movable image sensor 127, instead of the image sensors 121~125. The static image sensor 126 is located on the first axis D1 and configured to capture the first image, and the movable image sensor 127 is configured to move from the second axis D2 to the third axis D3 to capture the second image and the third image.

In some embodiments, the second axis D2 and the third axis D3 have similar angle X2 and X3 respectively with respect to the top surface 112 of the carrier 110, such that the movable image sensor 127 may be rotated horizontally from the position on the second axis D2 to the position on the third axis D3.

In some embodiments, as illustrated previously, more than the first to third images are taken, and the movable image sensor 127 is configured to capture at least one of the second image, the third image, the fourth image, and the fifth image along at least one of the second to fifth axes D2~D5 respectively. The movable image sensor 127 may move among the second to fifth axes D2~D5. In these embodiments, for example, some of the second axis D2, the third axis D3, and the fourth axis D4 may have similar angle X2~X4 with respect to the top surface 112 of the carrier 110, such that the movable image sensor 127 may be rotated horizontally and moves to the vacancies (i.e. dashed shapes). In some embodiments, the movable image sensor 127 may be rotated horizontally with respect to the first axis D1. However, in some other embodiments, the angle X2~X4 may not be the same, and the movable image sensor 127 may not only move horizontally, but also vertically.

It is noted that the image sensing component 120 may be implemented in many ways for taking the images along some of the first to fifth axis D1~D5, and is not limited to those shown in FIG. 1, FIG. 3, and FIG. 4. For example, the movable image sensor 127 may move among the first to fifth axis D1~D5, and the static image sensor 126 may be omitted.

Other details of the present embodiments are similar to that of FIG. 1, and thereto not repeated herein.

Figure 5:
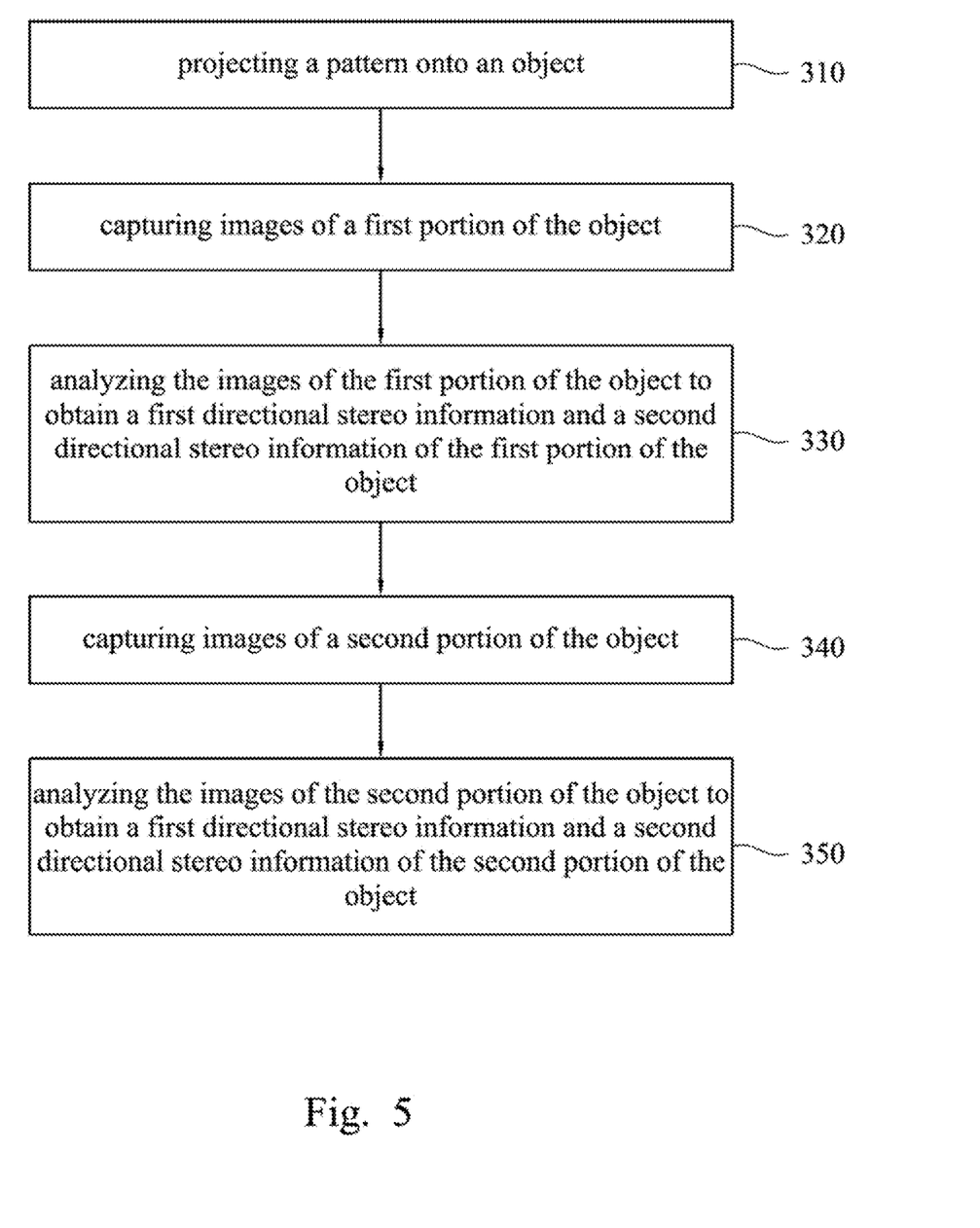
FIG. 5 is a flow chart of a method for three-dimensional inspection according to some embodiments of the invention.

FIG. 5 is a flow chart of a method 300 for three-dimensional inspection according to some embodiments of the invention. The method 300 includes steps 310~350, and is illustrated in accompany with at least one of FIG. 1, FIG. 3, and FIG. 4.

Figure 6:
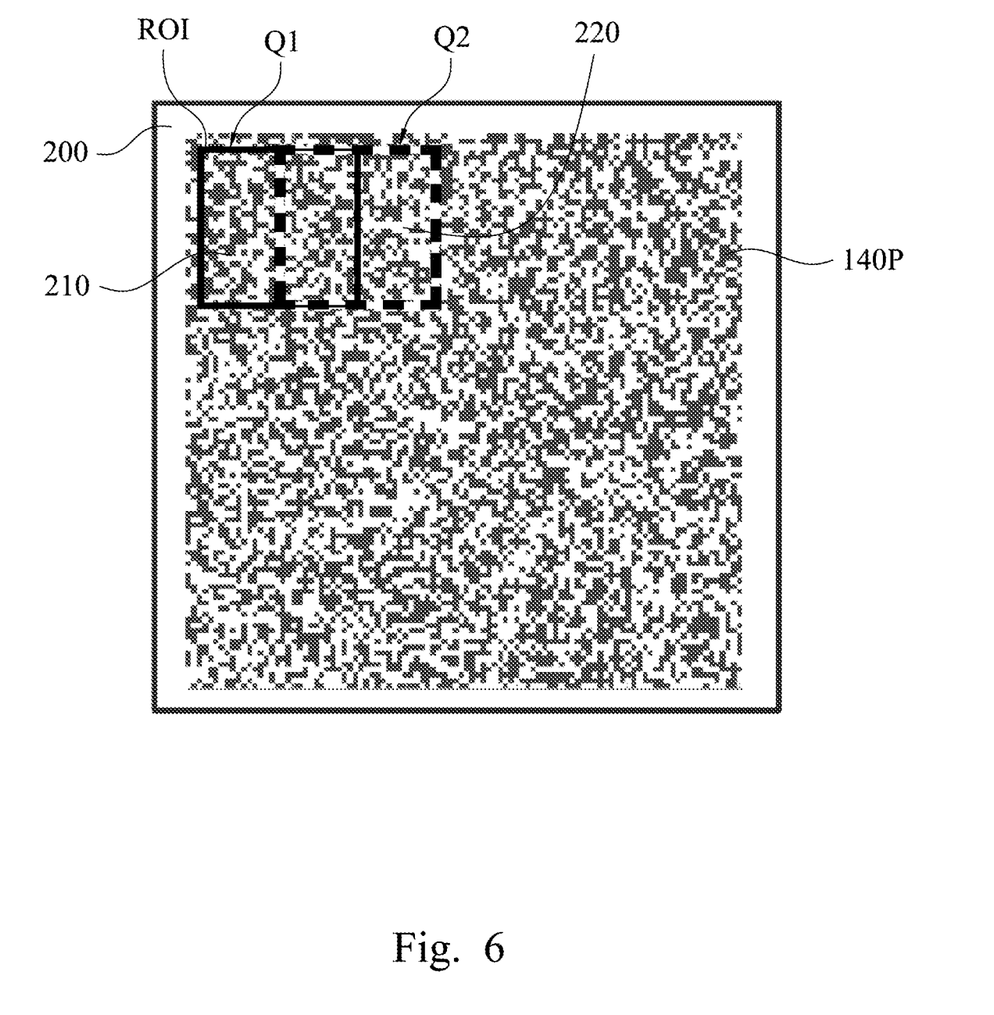
FIG. 6 is a top view of a light pattern on an object according to some embodiments of the invention.

First of all, at step 310, the projector 140 projects a light pattern 140P onto an object 200. FIG. 6 is a top view of a light pattern 140P on the object 200 according to some embodiments of the invention. The light pattern 140P projected onto the object 200 enables the images taken later to be mapping more precisely. In some embodiments, the light pattern 140P may be a fringe pattern. In some embodiments, the light pattern 140P may be a random dots pattern, which means the light pattern 140P includes plural dots distributed randomly. For the random dots pattern, the distributions of the dots on plural portions of the object 200 are different and unique, such that each portion of the object 200 is identifiable through the distribution of the dots thereon.

Furthermore, for the random dots pattern, the dots on the object 200 are arranged in a distribution such that the dots in plural regions of interest ROI are arranged uniquely. That is, the dots on a portion of the object 200 have a distribution different from the dots on any other portion of the object. For example, the dots in the region of interest ROI at a first position Q1 (indicated by solid bold line) have a distribution different from that of the dots in the region of interest ROI at a second position Q2 or any other position (indicated by dashed bold line), in which the region of interest ROI at the first position Q1 may be overlapped with the region of interest ROI at the second position Q2.

Herein, a first portion 210 of the object 200 is corresponded with the region of interest ROI at the first position Q1, and a second portion 220 of the object 200 is corresponded with the region of interest ROI at the second position Q2. The first portion 210 of the object 200 and the second portion 220 of the object 200 may or may not include the same feature of the object 200. In the present embodiments, the regions of interest ROI are located within the field of views of the image sensors, and may be associated with a portion of the captured image. The dots of light pattern 140P in the different regions of interest ROI are not limited to be distributed distinguishably. In some other embodiments, the regions of interest ROI may be distinguishable according to other factors.

In some situations, the inherent features of the object 200 are distinguishable, and this step 310 may be omitted.

Second, at step 320, images of the first portion 210 of the object 200 are captured. As aforementioned, the first to fifth images are captured along the first to fifth axes D1~D5. When the light pattern 140P is projected onto the object 200, the capturing the first to fifth image of the object 200 includes capturing the light pattern 140P on the object 200.

Then, at step 330, the first to fifth images of the first portion 210 of the object 200 are analyzed to obtain a first directional stereo information and a second directional stereo information of the first portion 210 of the object 200. As aforementioned, the determined image may be the first image, the fourth image, or any other images. The first directional stereo information and the second directional stereo information of the second portion 220 of the object 200 may or may not be integrated into an integrated stereo information. The analyzation method is illustrated previously, and omitted herein.

Next, at step 340, the region of interest ROI is moved to the second position Q2 of the object 200, and images of the second portion 220 of the object 200 are obtained. As aforementioned, the first to fifth images are taken along the first to fifth axes D1~D5. When the light pattern 140P is projected onto the object, the capturing the first to fifth image of the object 200 includes capturing the light pattern 140P on the object 200.

Then, at step 350, the first to fifth images of the second portion 220 of the object 200 are analyzed to obtain a first directional stereo information and a second directional stereo information of the second portion 220 of the object 200. As aforementioned, the determined image may be the first image, the fourth image, or any other images. The first directional stereo information and the second directional stereo information of the second portion 220 of the object 200 may or may not be integrated into an integrated stereo information. The analyzation method is illustrated previously, and omitted herein.

Through configuration, stereo information of the first and second portions 210 and 220 of the object 200 are built respectively. It is noted that more than two stereo information may be calculated and obtained, which is illustrated previously and omitted herein. The stereo information of the plural portions of the object 200 may be processed and combined by the processor 130 into the integrated stereo information of the object.

In summary, according to the exemplary embodiments of the invention, the appearance of the object is reconstructed from the first and second directional stereo information. The first and second directional stereo information may be obtained by calculating two pairs of images respectively, in which they may share one of the images. Alternatively, the first and second directional stereo information may be obtained by two pairs of different images, in which the images are different from each other. Through the configuration, the accuracy of the inspection of the object is enhanced.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. An apparatus for three-dimensional inspection, comprising:
    a carrier configured to hold an object;
    a projector configured to project a light pattern onto the object, wherein the light pattern includes a plurality of dots distributed randomly on the object, and a distribution of the dots on a first portion of the object is different and unique from a distribution of the dots on a second portion of the object, wherein the first portion of the object is different from and partially overlaps with the second portion of the object;
    an image sensing component configured to capture first to fifth images of the object along first to fifth axes respectively, wherein the image sensing component comprises a static image sensor and a movable image sensor, the static image sensor is located on the first axis for capturing the first image, the movable image sensor is configured to rotate horizontally among the second to fifth axes with respect to the first axis to respectively capture the second to fifth images, the first to fifth axes are not parallel with each other, and the first axis is orthogonal to a top surface of the carrier and has the same angle with respect to the second to fifth axes, and the first, second, and fifth axes are on a first plane, and the first, third, fourth axes are on a second plane crossing the first plane, wherein the first plane is not orthogonal to the second plane, wherein the image sensing component is configured to capture the first to fifth images of the first portion of the object and the light patterns on the first portion, and subsequently configured to capture the first to fifth images of the second portion of the object and the light patterns on the second portion; and
    a processor connected to the image sensing component and configured to analyze the first image and the second image to obtain a first directional stereo information, analyze the first image and the third image to obtain a second directional stereo information, analyze the first image and the fourth image to obtain a third directional stereo information, analyze the first image and the fifth image to obtain a fourth directional stereo information, analyze the second image and the fifth image to obtain a fifth directional stereo information, and analyze the third image and the fourth image to obtain a sixth directional stereo information, wherein:
        for the first to fifth images of the first portion of the object, the processor is configured to analyze the first image and the second image to obtain the first directional stereo information, analyze the first image and the third image to obtain the second directional stereo information, analyze the first image and the fourth image to obtain the third directional stereo information, analyze the first image and the fifth image to obtain the fourth directional stereo information, analyze the second image and the fifth image to obtain the fifth directional stereo information, and analyze the third image and the fourth image to obtain the sixth directional stereo information;

for the first to fifth images of the second portion of the object, the processor is configured to analyze the first image and the second image to obtain the first directional stereo information, analyze the first image and the third image to obtain the second directional stereo information, analyze the first image and the fourth image to obtain the third directional stereo information, analyze the first image and the fifth image to obtain the fourth directional stereo information, analyze the second image and the fifth image to obtain the fifth directional stereo information, and analyze the third image and the fourth image to obtain the sixth directional stereo information; and the processor is configured to combine the first to sixth directional stereo the first to sixth directional stereo information obtained from the first to fifth images of the second portion of the object to construct an integrated stereo information of the object.

2. The apparatus of claim 1, wherein the third axis is not located on the first plane formed by the first axis and the second axis.

3. The apparatus of claim 2, wherein the third axis and the fourth axis respectively extend from the top surface of the carrier toward opposite sides of the first plane.

4. The apparatus of claim 3, wherein the second axis and the fifth axis respectively extend from the top surface of the carrier toward opposite sides of the second plane formed by the third axis and the fourth axis.

5. The apparatus of claim 1, wherein the first to fifth axes intersect at a point.

* * * * *